United States Patent [19]

Gattus et al.

[11] 3,721,639

[45] March 20, 1973

[54] PROCESS FOR CASTING POLYPHENYLENE OXIDE FILMS ON STAINLESS STEEL SUPPORTS USING A VEGETABLE OIL ADDITIVE

[75] Inventors: Jean Gattus, 43 Rue des Charmettes, 69 Villeurbanne; Maurice Mallet, 37 Rue Servient, Lyon, both of France

[22] Filed: July 19, 1971

[21] Appl. No.: 164,010

Related U.S. Application Data

[63] Continuation-in-part of Ser. No. 882,804, Dec. 5, 1969, abandoned.

[30] Foreign Application Priority Data

Dec. 9, 1968 France..............................68177237

[52] U.S. Cl..........260/18 PF, 260/18 R, 260/30.4 R, 260/37 R, 260/47 ET, 264/300
[51] Int. Cl................................................C08g 23/18
[58] Field of Search..........260/18 PF, 47 ET, 30.4 R, 260/37 R, 18 R; 264/300

[56] References Cited

UNITED STATES PATENTS

| | | | |
|---|---|---|---|
| 2,225,552 | 12/1940 | Colbeth | 260/398 |
| 2,569,502 | 10/1951 | Swern et al. | 260/348 |
| 3,380,880 | 4/1968 | Wheeler | 260/47 |
| 3,535,281 | 10/1970 | Hay | 260/47 |

FOREIGN PATENTS OR APPLICATIONS

| | | | |
|---|---|---|---|
| 611,431 | 10/1960 | Canada | 106/38.24 |
| 1,234,336 | 10/1960 | France | 260/47 |

OTHER PUBLICATIONS

The Technology of Plastics and Resins, Van Nostrand Inc., New York, by Mason et al., 1945, TP 986 A, M3, page 405.

*Primary Examiner*—Donald E. Czaja
*Assistant Examiner*—Eugene C. Rzucidlo
*Attorney*—Stevens, Davis, Miller & Mosher

[57] ABSTRACT

Polyphenylene oxide containing films which do not adhere to stainless steel casting plates are formed from compositions containing polyphenylene oxide and a vegetable oil which may be epoxidized.

8 Claims, No Drawings

PROCESS FOR CASTING POLYPHENYLENE OXIDE FILMS ON STAINLESS STEEL SUPPORTS USING A VEGETABLE OIL ADDITIVE

This application is a continuation-in-part of our application Ser. No. 882,804, filed Dec. 5, 1969, now abandoned.

The present invention provides compositions based on poly(phenylene oxide) yielding films of excellent quality which do not adhere to the stainless steel carriers onto which they are cast.

It is known (French Pat. No. 1,234,336) that phenolic polyethers or poly(phenylene oxides) may be converted into films by casting solutions of these polymers onto a plane surface and evaporating the solvent. The films obtained possess excellent mechanical and electrical properties which make them suitable for numerous applications, for example, electrical insulation. These properties may further be improved by stretching (French Pat. No. 1,353,706). It has, however, been found that while the formation of films by casting on a glass plate does not present any difficulty, casting on a stainless steel belt has disadvantages because the film strongly adheres to the belt, and, on an industrial scale, the manufacture of films by casting most frequently employs such a carrier.

According to the present invention there are provided compositions comprising a polyphenylene oxide of the formula:

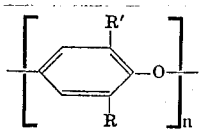

in which R and R', which may be the same or different, each represent hydrogen or a monovalent, aliphatic, cycloaliphatic or aromatic hydrocarbon radical; or a hydrocarbon radical substituted by halogen and containing at least two carbon atoms between the halogen atom and the phenolic nucleus; or a hydrocarbon, or a halogen-substituted hydrocarbon, radical bonded to the phenolic nucleus via an oxygen atom; and $n$ is at least 100; and 0.5 to 10 percent by weight, relative to the weight of the polyphenylene oxide, of a vegetable oil.

As examples of hydrocarbon radicals represented by R and R' there may be mentioned alkyl radicals, such as methyl, ethyl, propyl, hexyl, decyl, octadecyl; cycloalkyl radicals, such as cyclohexyl, ethylcyclohexyl; alkenyl radicals, such as vinyl, allyl, cyclobutenyl; aryl, such as phenyl; alkylaryl or aralkyl radicals. As examples of ether radicals represented by R and R' there may be mentioned methoxy, ethoxy, butenoxy, phenoxy, or phenylpropoxy; these radicals may also be substituted by a halogen atom provided there are at least two carbon atoms between the halogen atom and the phenolic nucleus.

As particular examples of poly(phenylene oxides) there may be mentioned: poly(2,6-dimethyl-1,4-phenylene oxide), poly(2,6-diethyl-1,4-phenylene oxide), poly(2,6-dibutyl-1,4-phenylene oxide), poly(2,6-dipropyl-1,4-phenylene oxide), poly(2,6-dilauryl-1,4-phenylene oxide), poly(2,6-dimethoxy-1,4-phenylene oxide), poly(2,6-diethoxy-1,4-phenylene oxide), poly(2-methoxy-6-ethoxy-1,4-phenylene oxide), poly(2,6-di(chlorophenoxy)-1,4-phenylene oxide), poly(2,6-di(chlorethyl)-1,4-phenylene oxide), poly(2-methyl-6-isobutyl-1,4-phenylene oxide), poly(2,6-ditolyl-1,4-phenylene oxide), and poly(2,6-di(chloropropyl)-1,4-phenylene oxide).

The preparation of such phenylene oxide polymers is known. For example, they may be obtained as described in French Pat. No. 1,234,336 by oxidation of the corresponding phenol with oxygen in the presence of a tertiary amine and a copper salt.

The vegetable oil, which may be epoxidized, represents 0.5 to 10 percent, preferably 1 to 5 percent, of the weight of the polymer; it is possible to use one of the numerous varieties of known fatty vegetable oils such as those quoted in Kirk Othmer, 2nd Edition, volume 8, pages 778 to 780, provided that it exhibits sufficient compatibility with the polymer or an oily terpene-comprising mixture, such as pine oil. It will preferably be chosen from the group consisting of: soya oil, pine oil, cottonseed oil, colza oil, castor oil, linseed oil or one of these oils which has been epoxidized beforehand. Any diluent used must be compatible both with the polymer and with the vegetable oil. It has been found that solvents for phenylene oxide polymers are suitable diluents. As examples of such diluents, there may be mentioned: chloroform, dichloroethylene, carbon tetrachloride, toluene and benzene. The preferred solvent is chloroform. The amount of diluent present in the compositions is such that the proportion (by weight) of polymer is suitably between 5 and 40 percent and preferably 15 to 25 percent. Such compositions are suitable for the manufacture of films by casting.

It should be understood that these compositions can also be filled, for example with finely divided silica of combustion.

The preparation of the compositions can be carried out without difficulty. For example, the various constituents can be introduced into a vessel and stirred at atmospheric pressure or under pressure, and at ambient temperature or at a higher temperature. It is also possible to prepare a solution of the polymer and then to incorporate the vegetable oil with stirring.

After stirring and removing bubbles, the polymer solution is ready to be cast.

The films produced from the compositions of the invention exhibit the remarkable property of separating very easily from the stainless steel belts onto which they are usually cast. No sticking is observed. The mechanical properties of these films are excellent and no harmful effect attributable to the presence of the vegetable oil is observed. In particular, these films show no change in color or dimension after being kept in a chamber heated to 150°C.

The following examples illustrate the invention.

EXAMPLE 1

16.5 l. of chloroform, 7 kg. of a poly(2,6-dimethyl-1,4-phenylene oxide) (intrinsic viscosity : 0.47), 100 g. of epoxidized soya oil and 10.5 g. of silica of combustion of high specific surface area were introduced into a 100 l. flask with a propeller stirrer.

The mixture was stirred for 5 hours 30 minutes under a pressure of 150–200 g./cm², at a temperature of about 60°C. The polymer solution was filtered under a pressure of 2.5 kg. through a flannelette cloth. It was transparent, and brown in color. Bubbles were removed in an oven at 35°C. for 15 hours.

The polymer solution was cast by means of a doctor-type casting machine onto a stainless steel belt (casting speed : 210 m./hr.). It was found that once it was dry (10 minutes at 75°C.) the film separated from the stainless steel belt without any difficulty. The film was 40μ thick; it was light, transparent, glossy, and slightly straw yellow in color.

A film cast under the same conditions but starting from a polymer solution not containing epoxidized soya oil adhered strongly to the stainless steel belt : numerous points of sticking were observed, resulting in deformations and even in tears in the latter if the sticking was tenacious.

The film prepared according to the invention was placed in a chamber at 150°C., for 15 minutes; at the end of the operation, neither a change in color nor in dimensions was observed.

EXAMPLE 2

22 percent strength polymer solutions in chloroform of the polymer of 2,6-dimethyl-1,4-phenylene oxide used in Example 1 were prepared.

One of the oils quoted below was incorporated into each of the polymer solutions at the rate of 2 percent relative to the weight of the polymer : soya oil, pine oil, cottonseed oil, colza oil, castor oil and linseed oil. After stirring and removal of bubbles, the polymer solutions were cast to give films of approximately 40μ thickness. In all cases the separation of the films from the stainless carrier was effected without difficulty.

When these films were subjected to 150°C. for 15 minutes, they showed no change whatsoever in either color or dimensions.

We claim:

1. In a process for casting a polyphenylene oxide on a stainless steel support, the improvement wherein the casting composition comprises a polyphenylene oxide of the formula:

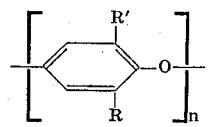

in which R and R', which may be the same or different, each represent hydrogen or a monovalent, aliphatic, cycloaliphatic or aromatic hydrocarbon radical; or a hydrocarbon radical substituted by halogen and containing at least two carbon atoms between the halogen atom and the phenolic nucleus; or a hydrocarbon, or a halogen-substituted hydrocarbon radical bonded to the phenolic nucleus via an oxygen atom; and $n$ is at least 100; and 0.5 to 10 percent by weight, relative to the weight of the polyphenylene oxide, of a vegetable oil, incorporated therein.

2. A process according to claim 1 in which the polyphenylene oxide is poly(2,6-dimethyl-1,4-phenylene oxide).

3. A process according to claim 1 in which the vegetable oil is epoxidized.

4. A process according to claim 1 in which the vegetable oil is selected from the group consisting of soya oil, epoxidized soya oil, pine oil, cottonseed oil, colza oil, castor oil and linseed oil.

5. A process according to claim 1 in which the casting composition contains from 15 to 25 percent by weight of polyphenylene oxide.

6. A process according to claim 1 in which the casting composition contains from 1 to 5 percent by weight of vegetable oil, relative to the polyphenylene oxide.

7. A process according to claim 1 in which the casting composition additionally comprises a solvent for the polyphenylene oxide.

8. A process according to claim 1 in which the casting composition additionally comprises silica of combustion as a filler.

* * * * *